United States Patent [19]

Rice

[11] Patent Number: 4,897,187
[45] Date of Patent: Jan. 30, 1990

[54] PORTABLE WATER FILTRATION APPARATUS

[76] Inventor: William J. Rice, 1515 E. Broward Blvd. Apt 322, Ft. Lauderdale, Fla. 33301

[21] Appl. No.: 279,826
[22] Filed: Dec. 5, 1988
[51] Int. Cl.$^4$ .......................................... B01O 21/34
[52] U.S. Cl. ................... 210/137; 210/232; 210/238; 210/245; 210/266; 210/282; 210/259; 210/470
[58] Field of Search ................ 210/90, 137, 232, 238, 210/244, 245, 266, 282, 284, 470, 259

[56] References Cited

U.S. PATENT DOCUMENTS

| | | | |
|---|---|---|---|
| 2,302,552 | 11/1942 | Johnson | 210/266 |
| 2,987,187 | 6/1961 | Comroe | 210/244 |
| 3,225,929 | 12/1965 | Sicard | 210/232 |
| 3,262,570 | 7/1966 | Gailitis et al. | 210/266 |
| 3,406,828 | 10/1968 | Boston | 210/137 |
| 3,785,970 | 1/1974 | Hodgkins | 210/332 |
| 3,950,251 | 4/1976 | Hiller | 210/266 |
| 4,003,835 | 1/1977 | Johnson | 210/232 |
| 4,013,562 | 3/1977 | Gott | 210/232 |
| 4,049,550 | 9/1977 | Obidniak | 210/152 |
| 4,301,005 | 11/1981 | Schön et al. | 210/238 |
| 4,541,926 | 9/1985 | Stanley | 210/284 |
| 4,609,466 | 9/1986 | McCausland et al. | 210/244 |
| 4,670,144 | 6/1987 | McCausland et al. | 210/244 |
| 4,681,677 | 7/1987 | Kuh et al. | 210/266 |
| 4,713,175 | 12/1987 | Bray | 210/282 |
| 4,810,388 | 3/1989 | Trasen | 210/238 |
| 4,816,149 | 3/1989 | Wekell | 210/470 |

*Primary Examiner*—Richard V. Fisher
*Assistant Examiner*—Cynthia L. Nessler
*Attorney, Agent, or Firm*—Oltman and Flynn

[57] ABSTRACT

A portable water filtration apparatus for use on a boat has a sediment filter unit and a secondary filter unit connected in series and located between end plates on a base including a flat back plate behind the two filter units. The back plate has a horizontally elongated opening above the filter units, and above this opening it provides a handle that can be conveniently grasped by a person. A first hex flange attaches the inlet end of the sediment filter unit to one of the end plates of the base and also supports a pressure regulator on the outside of this end plate. A second hex flange attaches the outlet end of the secondary filter unit to the other end plate of the base and also supports a hose coupling member on the outside of this end plate.

5 Claims, 2 Drawing Sheets

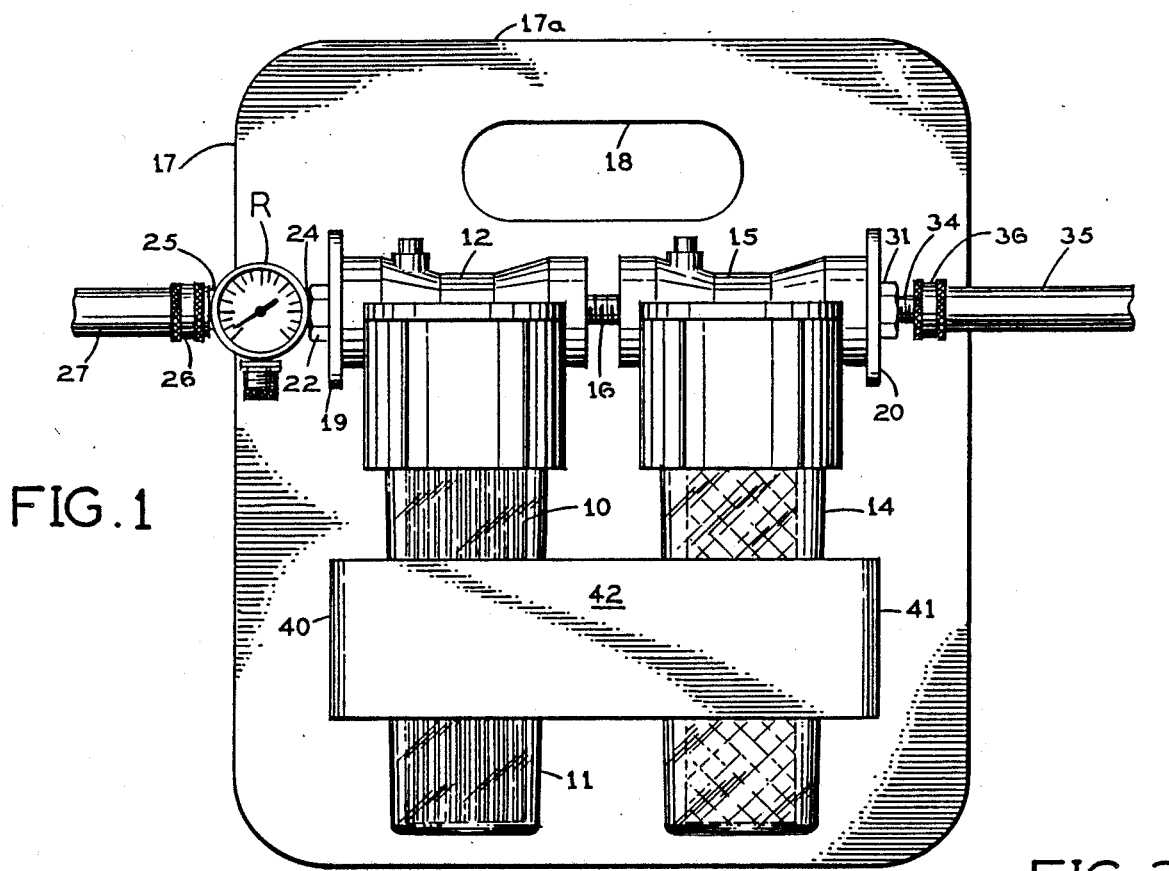
FIG. 1
FIG. 2
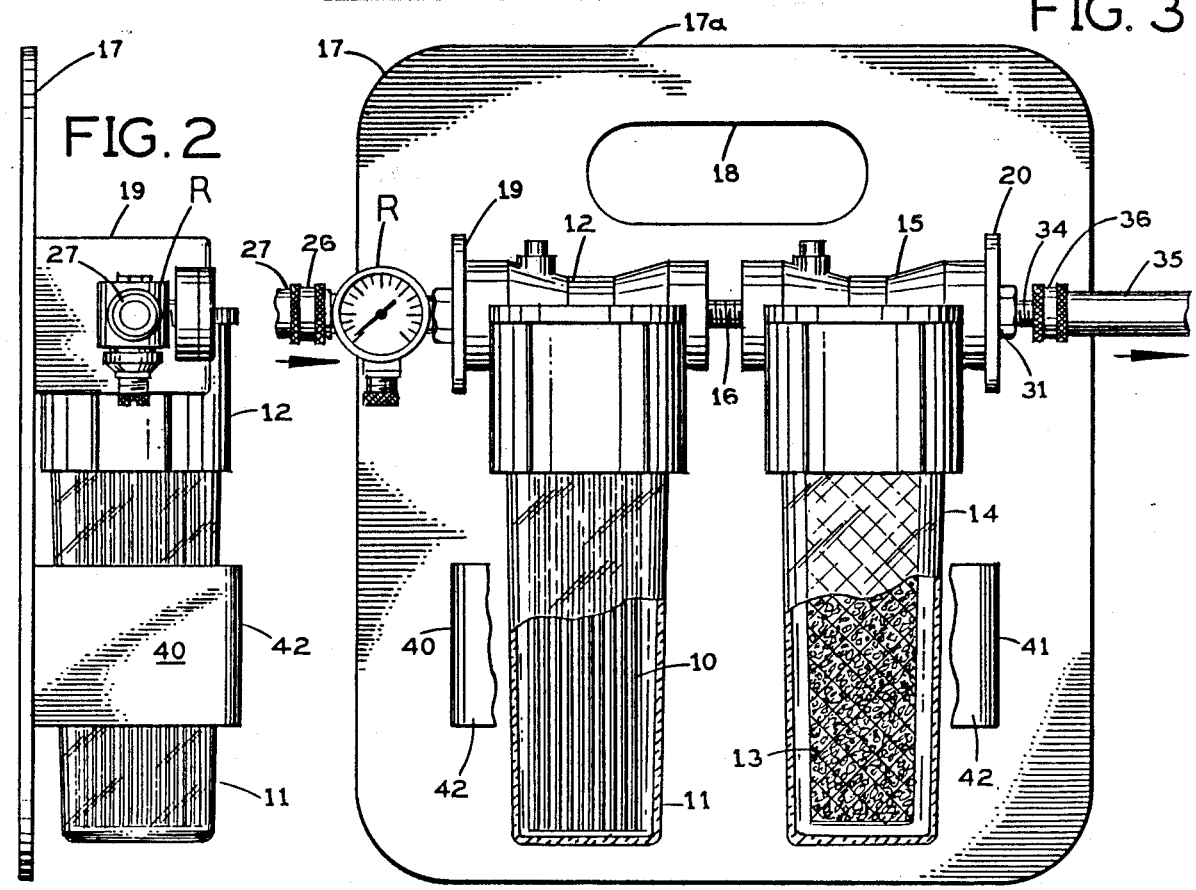
FIG. 3

PORTABLE WATER FILTRATION APPARATUS

SUMMARY OF THE INVENTION

This invention relates to a portable water filtration apparatus which is especially advantageous for use on a boat.

A principal object of this invention is to provide a novel portable water filtration apparatus which to be put in use requires only to be connected to conventional water inlet and outlet hoses having conventional hose coupling members.

Another object of this invention is to provide such a filtration apparatus which includes a pressure regulator, a sediment filter unit for removing particles from water, and a secondary filter for removing impurities and objectionable taste and odor ingredients from water.

Further objects and advantages of this invention will be apparent from the following detailed description of a presently preferred embodiment which is illustrated schematically in the accompanying drawings.

Preferably, the apparatus of the present invention comprises a base including a flat back plate behind a sediment filter unit and a secondary filter unit connected in series. The back plate of the base has a horizontally elongated opening above the sediment and secondary filter units, and above this opening it provides a handle that can be conveniently grasped by a person's hand. The base has a first transverse end plate extending out from its back plate next to the inlet end of the sediment filter unit and a second transverse end plate extending out from its back plate next to the outlet end of the secondary filter unit. A first hex flange connects the inlet end of the sediment filter unit to the first end plate of the base and also mounts a pressure regulator on the outside of the first end plate. A second hex flange connects the outlet end of the secondary filter unit to the second end plate of the base and also supports a male housing coupling member outside the second end plate.

DESCRIPTION OF THE DRAWINGS

FIG. 1 is a front elevation of the present invention;

FIG. 2 is an end elevation taken from the left side of FIG. 1;

FIG. 3 is a view like FIG. 1 but with certain parts broken away;

Figure 4:
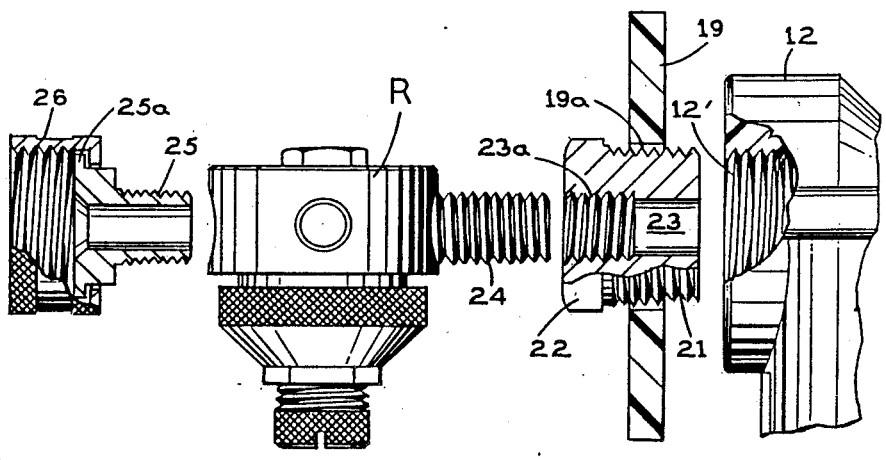
FIG. 4 is an exploded view showing the parts at the inlet side of the apparatus.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIG. 1, the apparatus of the present invention includes a sediment filter unit of known design having a porous filter cartridge 10 which fits with a substantial clearance inside a transparent canister 11 extending down from a head 12. The head 12 has a water inlet opening 12' (FIG. 4) at its left end, a first passageway for conducting the incoming water down into the canister 11 outside the filter cartridge 10, a second passageway for passing the filtered water from the inside of filter cartridge 10, and an outlet opening at its right end which receives the filtered water from the second passageway. Both the inlet opening and the outlet opening in head 12 of the sediment filter unit are screw-threaded.

The present apparatus also has a secondary filter unit of known design having a porous filter cartridge 13 containing activated charcoal which fits with a substantial clearance inside a transparent canister 14 extending down from a head 15. Head 15 has a water inlet opening at its left end, a first passageway connecting the water inlet opening to the annular space inside the canister 14 surrounding the filter cartridge 13, a second passageway for passing the twice-filtered water from the inside of filter cartridge 13, and an outlet opening 15' (FIG. 5) at its right end which receives the twice-filtered water from this second passageway. Both the inlet opening and the outlet opening in head 15 of the secondary filter unit are screw-threaded.

A threaded pipe nipple 16 connects the outlet opening in head 12 of the sediment filter unit to the inlet opening in head 15 of the secondary filter unit. Nipple 16 is threadedly received in these openings. The subassembly of this nipple and the two filter units is a rigid structure that can be handled as a unit.

The present apparatus has a rigid support base which includes a flat, generally rectangular back plate 17, with rounded corners, extending behind the rigid sub-assembly of the two filter units 10-12 and 13-15 and the pipe nipple 16 connecting them. Back plate 17 has a horizontally elongated opening 18 extending above the filter unit heads 12 and 15 and pipe nipple 16 a short distance below the top edge 17a of plate 17, so that the segment of this plate above the opening provides a handle to carry the apparatus, with all the fingers of a persons's hand being received in the opening 18. The support base has a pair of rigid transverse end plates 19 and 20 which are rigidly joined to its back plate 17 and extend forward from it. End plate 19 is next to the inlet end of head 12 of the sediment filter 10-12 and it has a cylindrical opening 19a (FIG. 4) that registers with the threaded inlet opening 12' in head 12. End plate 20 is next to the outlet end of head 15 of the secondary filter 13-15 and it has a cylindrical opening 20a (FIG. 5) that registers with the threaded outlet opening 15' in head 15. The base also has a rigid three-sided shield having opposite end legs 40 and 41 which extend forward perpendicularly from the back plate 17 and a flat bridging segment 42 which extends across the front of the canisters 11 and 14 of the two filter units to protect them.

As shown in FIG. 4, the opening 19a in end plate 19 loosely receives the externally screw-threaded hollow stem 21 of a first hex flange which has a hexagonal head 22 for engagement with the other face of end plate 19. The hex flange has an axial passage 23 which is screw-threaded at its left end, as shown at 23a. The stem 21 of the hex flange is threadedly received in the inlet opening 12' in the head 12 of the sediment filter unit.

A water pressure regulator R of known design has a screw-threaded hollow stem 24 on its outlet side for threaded reception in the screw-threaded portion 23a of the first hex flange's passage 23. At its inlet side the pressure regulator has a screw-thread opening which threadedly receives the screw-threaded hollow stem 25 of a fitting having an enlarged head 25a that rotatably supports a female hose coupling member 26 of known design. An inlet hose 27 (FIG. 1) has a male hose coupling member or nipple which is threadedly received in the female coupling member 26 to detachably connect the inlet hose to the pressure regulator.

Figure 5:
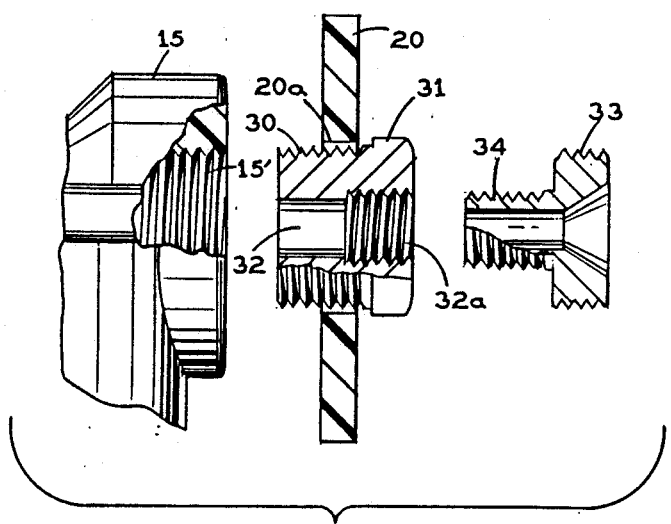
FIG. 5 is an exploded view showing the parts at the outlet side of the apparatus.

As shown in FIG. 5, the opening 20a in end plate 20 loosely receives the externally screw-threaded hollow stem 30 of a second hex flange which has a hexagonal head 31 for engagement with the outside of end plate 20. This hex flange has an axial passage 32 which is screw-threaded at its right end, as shown at 32a. The stem 30 of the second flange is threadedly received in the outlet opening 15' in head 15 of the secondary filter unit.

A male hose coupling member 33 has a reduced externally screw-threaded stem 34 that is threadedly received in the screw-threaded portion 32a of the passage through the second hex flange. An outlet hose 35 (FIG. 1) has a female hose coupling member 36 that is detachably connected to the male hose coupling member 33.

After pipe nipple 16 has been connected to the head 12 of the sediment filter unit 10-12 and to the head 15 of the secondary filter unit 13-15 to form a rigid, unitary sub-assembly, this sub-assembly is inserted slidably between the end plate 19 and 20 of the support base. The first hex flange 21-22 is threadedly inserted into the inlet opening 12' in the head 12 of the sediment filter unit until its hexagonal head 22 tightly engages the outside face of end plate 19 and holds the inlet end of head 12 tightly against the inside face of end plate 19. The pressure regulator R is threadedly connected to the first hex flange 21-22 either before or after its connection to head 12 of the sediment filter unit, as described. The second hex flange 30-31 is threadedly inserted into the outlet opening 15' in the head 15 of the secondary filter until its hexagonal head 31 tightly engages the outside face of end plate 20 and holds the outlet end of head 15 tightly against the inside face of end plate 20. The male hose coupling member 33 is threadedly connected to the second hex flange 30-31 either before or after its connection to head 15 of the secondary filter unit, as described.

This assembly provides a unitary apparatus that is easily carried by a person to and from the place where it may be put in use, such as on a bulkhead of a boat. All that remains to be done then is to connect the female hose coupling 26 on an inlet hose 27 to the inlet side of pressure regulator R and connect the female hose coupling member 36 on an outlet hose 35 to the male hose coupling member 33 on the second hex flange 30-31.

I claim:
1. A portable water filtration apparatus comprising:
   a mounting base having a back plate and first and second parallel end plates extending perpendicularly forward from said back plate, each of said end plates having an opening therein;
   a sediment filter unit having a head with a water inlet on one side and a water outlet on the opposite side, and a porous filter cartridge extending down from said head of the sediment filter unit and arranged to filter water between said water inlet and outlet;
   a secondary filter unit having a head with a water inlet on one side and a water outlet on the opposite side, and a filter cartridge with activated charcoal therein extending down from said head of the secondary filter unit and arranged to filter water between said water inlet and outlet of said head of the secondary filter unit;
   a pipe nipple connecting said water outlet of said head of the sediment filter unit to said water inlet of said head of the secondary filter unit;
   said head of the sediment filter unit, said pipe nipple and said head of the secondary filter unit having a combined length substantially equal to the distance between the inside faces of said end plates on the mounting base;
   a pressure regulator having a water inlet and a water outlet;
   manually attachable and releasable means at said opening in said first end plate holding said one side of said head of the sediment filter unit against the inside of said first end plate and holding said pressure regulator on the outside of said first end plate with said water outlet of the pressure regulator registering with said water inlet of said head of the sediment filter unit at said opening in said first end plate;
   and manually attachable and releasable means at said opening in said second end plate holding said opposite side of said head of said secondary filter unit against the inside of said second end plate with said water outlet of said head of the secondary filter unit registering with said opening in said second end plate.

2. An apparatus according to claim 1 wherein:
   said water inlet of said head of the sediment filter unit is a screw-threaded opening which is open toward said first end plate of the mounting base and registers with said opening in said first end plate;
   and said manually attachable and releasable means holding said head of the sediment filter unit against said first end plate is a hollow bushing having (a) a polygonal head engaging the outside of said first end plate around said opening in said first end plate and having a screw-threaded opening holding said pressure regulator, and (b) an externally screw-threaded stem joined to said polygonal head and passing through said opening in said first end plate and threadedly received in said screw-threaded opening in said head of the sediment filter unit, said stem having an opening therethrough which is a continuation of said screw-threaded opening in said polygonal head for passing water from the outlet of the pressure regulator to the inlet of said head of the sediment filter unit.

3. An apparatus according to claim 2 wherein:
   said water outlet of said head of the secondary filter unit is a screw-threaded opening which is open toward said second end plate of the mounting base and registers with said opening in said second end plate;
   and said manually attachable and releasable means holding said head of the secondary filter unit against said second end plate is a hollow bushing having (c) a polygonal head engaging the outside of said second end plate around said opening in said second end plate and having a screw-threaded opening, and (d) an externally screw-threaded stem joined to said polygonal head and passing through said opening in said second end plate and threadedly received in said head of the secondary filter unit, said stem having an opening therethrough which is a continuation of said screw-threaded opening in said polygonal head;
   and further comprising a male hose coupling member releasably attachable to a female hose coupling member outside said second end plate and having an externally screw-threaded stem threadedly received in said screw-threaded opening in said polygonal head of said bushing holding said head of the secondary filter unit against said second end plate.

4. An apparatus according to claim 3, wherein said back plate has a horizontally elongated opening therein near the top above said end plates.

5. An apparatus according to claim 1 wherein:
said water outlet of said head of the secondary filter unit is a screw-threaded opening which is open toward said second end plate of the mounting base and registers with said opening in said second end plate;
and said manually attachable and releasable means holding said head of the secondary filter unit against said second end plate is a hollow bushing having (a) a polygonal head engaging the outside of said second end plate around said opening in said second end plate and having a screw-threaded opening, and (b) an externally screw-threaded stem joined to said polygonal head and passing through said opening in said second end plate and threadedly received in said head of the secondary filter unit, said stem having an opening therethrough which is a continuation of said screw-threaded opening in said polygonal head;

and further comprising a male hose coupling member releasably attachable to a female hose coupling member outside said second end plate and having an externally screw-threaded stem threadedly received in said screw-threaded opening in said polygonal head of said bushing holding said head of the secondary filter unit against said second end plate.

* * * * *